(12) United States Patent
Vasudevan

(10) Patent No.: US 7,558,255 B2
(45) Date of Patent: Jul. 7, 2009

(54) METHOD OF SWITCHING MODES OF UPLINK TRANSMISSION IN A WIRELESS COMMUNICATION SYSTEM

(75) Inventor: Subramanian Vasudevan, Morristown, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 483 days.

(21) Appl. No.: 11/485,761

(22) Filed: Jul. 13, 2006

(65) Prior Publication Data

US 2008/0013476 A1    Jan. 17, 2008

(51) Int. Cl.
*H04L 12/66* (2006.01)

(52) U.S. Cl. .............. 370/355; 370/320; 370/328; 370/338; 370/342; 455/522; 455/69

(58) Field of Classification Search ........... 370/335, 370/320, 328, 338, 342; 455/522, 69
See application file for complete search history.

(56) References Cited

U.S. PATENT DOCUMENTS

2005/0059437 A1* 3/2005 Son et al. ................ 455/574
2005/0063345 A1  3/2005 Wu et al. ................. 370/335
2006/0050676 A1  3/2006 Mansour .................. 370/342

FOREIGN PATENT DOCUMENTS

WO  PCT/US2007/015918    1/2008

OTHER PUBLICATIONS

"Updated Lucent-Nortel-Samsung proposal for Air Interface Evolution Phase 2" 3GPP2, XP002463759, [Online], Apr. 26, 2006, pp. 96-131 (Retrieved from the Internet: URL:ftp://ftp.3gpp2.org/TSGC/Working/2006/2006-04-KansasCity/TSG-C-2006-04-KansasCity/WG3/C30-20060424-021-LU_NT_SS-Updated%20Joint%20Proposal%20for%20Air%20Interface%20Evolution%20phase2.pdf> [retrieved on Jan. 9, 2008] the whole document.

* cited by examiner

*Primary Examiner*—Nghi H Ly

(57) ABSTRACT

A hybrid multi-mode mobile station makes a decision either to encode and modulate a new user data packet using the same OFDMA or pre-coded CDMA mode used for the last retransmission of a previous packet or to switch modes based on inputs of a measured average transmission power of the previous packet and a Signal-to-Interference plus Noise Ratio (SINR) as determined from measurements made by the base station and either directly reported to the mobile station or calculated by the mobile station from measurements made by the base station that are reported back to the mobile station.

20 Claims, 2 Drawing Sheets

METHOD OF SWITCHING MODES OF UPLINK TRANSMISSION IN A WIRELESS COMMUNICATION SYSTEM

TECHNICAL FIELD

The invention relates to wireless communications, and more particularly, to a method of deciding to either remain in the same communication mode or to switch communication modes in a multi-mode system for an uplink transmission between a mobile station and a base station.

BACKGROUND OF THE INVENTION

In a proposal made to the 3GPP2 standards body, (Framework proposal for LBC mode of Rev C, C30-20060625-054R1, a contribution of a joint proposal for loosely backward compatible FDD mode of HRPD Rev C made by China Unicom, Huawei Technologies, KDDI, Lucent Technologies, Motorola, Nortel Networks, QUALCOMM Incorporated, RITT, Samsung Electronics, and ZTE, dated Jun. 26, 2006), a system is described that integrates pre-coded Code Division Multiple Access (pre-coded CDMA) and Orthogonal Frequency Division Multiple Access (OFDMA) on the uplink between a Mobile Station (MS) and a Base Station (BS). This hybrid CDMA-OFDMA uplink is intended to enable more efficient support of different types of traffic. Typically, it is proposed that this hybrid system will enable best-effort traffic at relatively high data rates to be transported on the OFDMA air-interface while delay-constrained traffic will be carried over the CDMA air-interface.

As is well known, CDMA is a scheme whereby multiple users are distinguished by their use of unique spreading codes. The actual spread sequence can be carried either by amplitude or phase modulating a pulse waveform (Direct-Spread [DS] CDMA or pulse-shaped CDMA), or on a set of orthogonal sinusoidal tones (Multi-Carrier [MC] CDMA). In the latter case, the spread sequence can also be coded prior to modulating the orthogonal tones. This type of multiple-access scheme is the afore-noted pre-coded CDMA and, when the coder is the Discrete Fourier Transform (DFT) matrix, it can be called DFT-CDMA.

OFDMA is a scheme whereby a unique set of sinusoidal frequencies is assigned to each user within a sector. MC- and pre-coded CDMA differs from OFDMA in three respects. Firstly, more than one user may transmit over the same set of frequencies in the MC- or pre-coded CDMA system. Secondly, different pilot structures may be used in these two cases to enable coherent detection. Thirdly, by an appropriate choice of the pre-coder in the case of pre-coded CDMA, the Peak-to-Average Power Ratio (PAPR) may be controlled to be lower than for an OFDMA transmission.

Since multiple users may transmit on the same frequencies, a CDMA link does not require scheduling by the base station to allocate and de-allocate frequencies to a particular user. Thus, CDMA permits autonomous operatio on the uplink and is particularly suited for initial random access, transmission of bursty information, and traffic with tight delay constraints. In the case of an OFDMA system, frequency resources must be allocated and de-allocated (or allocated and maintained), which entails both additional delay as well as use of forward link (FL) power and bandwidth resources to communicate these grants. A system in which frequency resources need be allocated and maintained can disadvantageously result in an inefficient use of reverse link resources since frequencies may lie unused for substantial periods of time.

In accordance with the present state of the art, in a hybrid system, such as the proposed 3GPP2 system, a new packet of user data is transmitted on the uplink by a mobile station in accordance with the type of traffic the data represents. Thus, as noted above, best-effort traffic at relatively high data rate will be transported on the OFDMA air interface, while lower-rate traffic, such as Voice Over Internet Protocol (VoIP), will be transported on the CDMA air interface where it can be transmitted autonomously and avoids the delay and bandwidth expenses of frequency allocation required by OFDMA. FIG. 1 is a high-level block diagram of a conventional hybrid mobile station 101 in accord with the afore-noted 3GPP2 standards proposal, which integrates both a pre-coded CDMA encoder and modulator 102 and an OFDMA encoder and modulator 103. Switches 106 at the input and outputs of encoder/modulators 102 and 103 are commonly switched so as to encode and modulate a new user data packet 104 via pre-coded CDMA or OFDMA in accordance with the type of traffic the packet represents. The CDMA- or OFDMA-encoded and modulated user data packet is then amplified and transmitted on the uplink 107 by amplifier and transmitter 108.

As noted, pre-coded CDMA and OFDMA differ in their PAPR characteristics. A pre-coded CDMA transmission has a lower PAPR than an OFDMA transmission. This difference in PAPR translates directly into a different maximum average transmission power for the two air-interfaces. For example, for the same power amplifier, where a mobile station may be able to sustain transmission at an average power of 200 milliwatts (mw) while transmitting using pre-coded CDMA, it may be able to sustain an average transmission power of no greater than 120 mw while using OFDMA. This is a result of the fact that the PAPR for an OFDMA transmission is higher, and in order to maintain the power excursions above the average that are similar for both OFDMA and pre-coded CDMA, the maximum average transmit power needs to be lower for OFDMA. The practical implication of this lower allowable average transmit power for OFDMA transmissions is that the cell radius for such OFDMA transmissions is smaller than for CDMA transmissions, or equivalently, a lower data rate is supported at the edge of sectors that were laid out for existing DS-CDMA systems. The conventional solution to alleviate this problem requires that either expensive PAPR reduction techniques be applied to the OFDMA waveform, or more powerful and therefore more expensive power amplifiers be used.

A less expensive methodology is thus needed in order to match data rates at a cell edge between existing DS-CDMA systems and the new proposed hybrid OFDMA-pre-coded CDMA systems.

SUMMARY OF THE INVENTION

In an embodiment of the present invention, a hybrid multi-mode mobile station makes a decision either to encode and modulate a new user data packet using the same OFDMA or pre-coded CDMA mode used for the last retransmission of a previous packet or to switch modes based on inputs of a measured average transmission power of the previous packet and a Signal-to-Interference plus Noise Ratio (SINR) as determined from measurements made by the base station and either directly reported to the mobile station or calculated by the mobile station from measurements made by the base station that are reported back to the mobile station.

In an embodiment, the measured average transmission power of the previous packet is compared with a maximum average OFDMA transmit power. If the previous packet was transmitted by the mobile station using the OFDMA mode, the new packet is also be encoded and modulated using OFDMA at the maximum allowed average power if the measured mobile station transmit power of the previous packet is less than the maximum average OFDMA transmit power. If the measured mobile station transmit power is greater than or equal to the maximum average OFDMA transmit power, then the new user data packet is transmitted in the CDMA mode at the maximum allowed average CDMA power if the received or calculated OFDMA SINR is indicative of a less that acceptable OFDMA data rate and the allowable CDMA transmit power is greater than the maximum average OFDMA transmit power, where the allowable CDMA transmit power is the minimum of the maximum average CDMA transmit power and any power limit imposed by adjacent sectors.

In an embodiment, if the previous packet was transmitted by the mobile station using the CDMA mode, the new user data packet is also transmitted using the CDMA mode at its maximum allowed average CDMA power if the measured average mobile station transmit power of the previous packet is greater than maximum average OFDMA transmit power. If the measured average mobile station transmit of the previous packet is less than or equal to the maximum average OFDMA transmit power, and the allowable average OFDMA transmit power is greater than the measured mobile station CDMA transmit power of the previous packet, and the received OFDMA SINR indicates that a better data rate is achievable using OFDMA, then the new user data packet is transmitted using the OFDMA mode at the maximum allowed OFDMA average transmission power.

BRIEF DESCRIPTION OF THE DRAWING

The present invention will be better understood from reading the following description of non-limiting embodiments, with reference to the attached drawings, wherein below.

DETAILED DESCRIPTION

Figure 1:
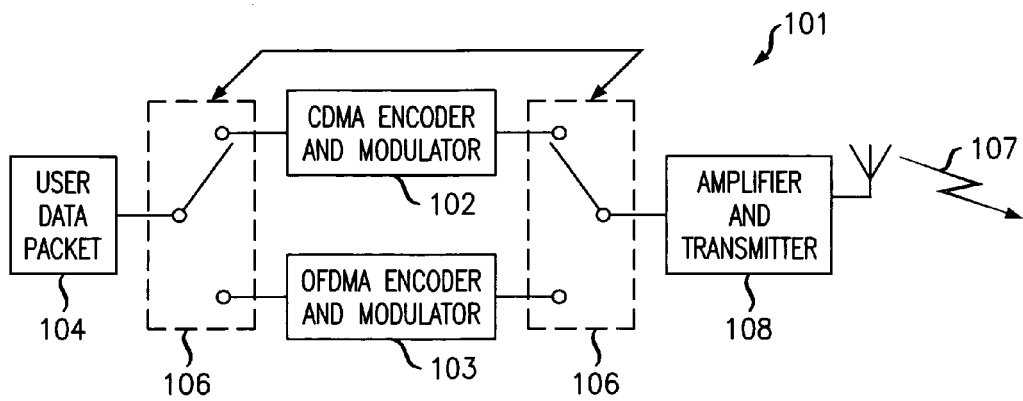
FIG. 1 is a high-level block diagram of a mobile station in a hybrid CDMA/OFDMA system according to conventional methodologies.
Figure 2:
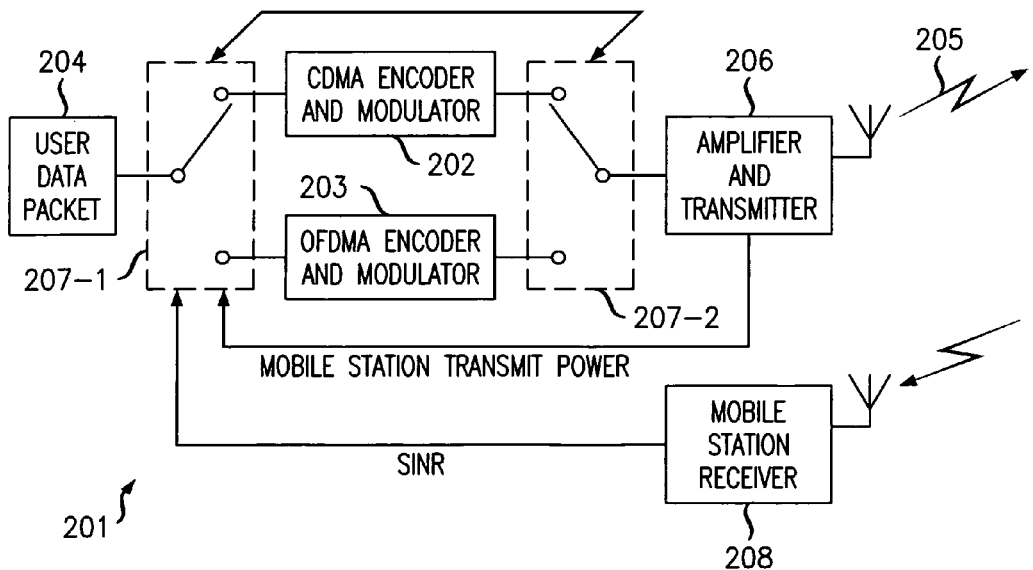
FIG. 2 is a high-level block diagram of a mobile station in a hybrid CDMA/OFDMA system in accordance with an embodiment of the present invention.

With reference to FIG. 2, a mobile station 201 in a hybrid pre-coded CDMA-OFDMA system is shown. As in the conventional system of FIG. 1, mobile station 201 includes a pre-coded CDMA encoder and modulator 202 and an OFDMA encoder and modulator 203. A user data packet 204 and its subsequent retransmissions, if any, are encoded by either CDMA encoder and modulator 202 or OFDMA encoder and modulator 203. The resultant encoded and modulated packet is then transmitted on the uplink 205 to the base station (not shown) after being amplified and transmitted by amplifier and transmitter 206. Unlike the prior art system of FIG. 1 which switches between the CDMA mode and the OFDMA mode in accordance with the type of traffic represented by each new user data packet to be transmitted, in the embodiment of FIG. 2, the switch positions of commonly controlled switches 207-1 and 207-2 are determined by a combination of both the measured average transmit power of the mobile station, as fed back to switch 207-1 from amplifier and transmitter 206, and an OFDMA SINR as measured by the base station (not shown) and reported over the downlink to mobile station receiver 208 or as calculated by the mobile station from measurements made by the base station and reported back to the mobile station. As will be described below, in response to each new user data packet 204, the mode of operatio of mobile station 201 either remains the same as was used for the previous user data packet, or is switched to the opposite mode in accordance with both the measured mobile station average transmit power during the previous packet and the reported-back or calculated OFDMA SINR.

Figure 3:
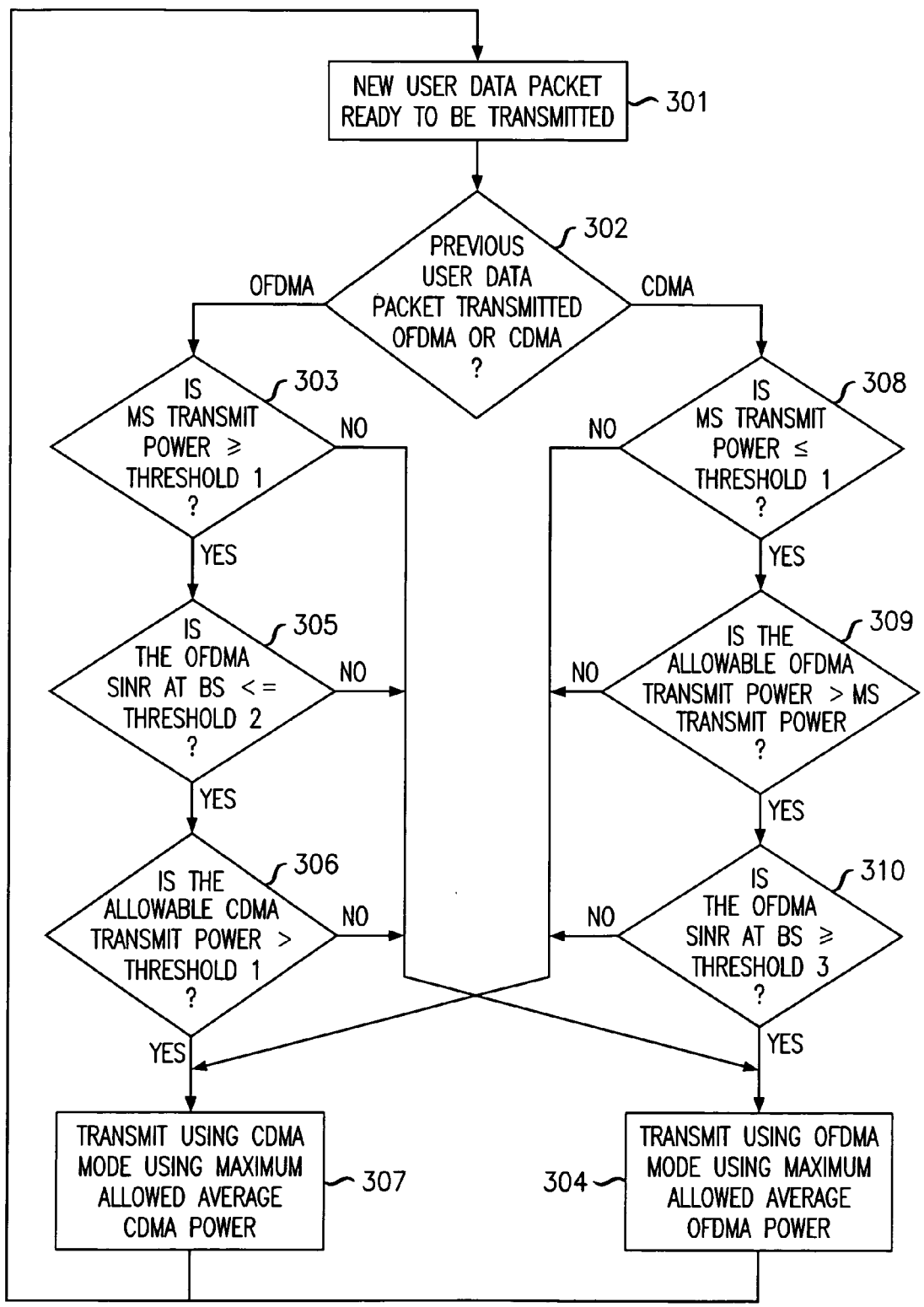
FIG. 3 is a flow chart showing a methodology, in accordance with an embodiment of the present invention, for determining in a hybrid CDMA/OFDMA system such as shown in FIG. 2, whether a new user data packet should be transmitted using the same mode as was used for the previous packet or whether the mode should be switched.

The methodology for determining whether a new user data packet should be encoded and modulated using a pre-coded CDMA mode or an OFDMA mode is shown in the flowchart of FIG. 3. At step 301, a new user data packet is ready for processing. At step 302, a determination is made whether the previously transmitted packet or any of its retransmissions were processed using the OFDMA mode or CDMA mode. If the previous packet was processed using the OFDMA mode, at step 303, a determination is made whether the mobile station transmit power during that packet's transmission or retransmission was greater than or equal to a first threshold, Threshold 1, which is the maximum average OFDMA transmit power. If the measured average transmit power (i.e., the mean value of the transmission power over a frame) of the mobile station is less than the maximum average OFDMA transmission power, then, at step 304, the new user data packet is also processed in the OFDMA mode and is transmitted over the granted OFDMA frequency resources using the maximum allowed average OFDMA transmit power, where the maximum allowable OFDMA transmit power is the minimum of the maximum average mobile station OFDMA transmit power limit (i.e., Threshold 1) and any power limit that is imposed by control signals from adjacent sectors. If, at step 303, the measured average mobile station transmit power is greater than or equal to the maximum average OFDMA transmit power (Threshold 1), then, at step 305, a determination is made whether the OFDMA SINR as measured at the base station and reported to the mobile station over the downlink or as calculated by the mobile station from measurements made by the base station that are reported back to the mobile station, is greater than a SINR threshold (Threshold 2) that corresponds to a minimum acceptable data rate using OFDMA. More specifically, the SINR measured by the base station and reported to the mobile station is mapped to a data rate that is supportable by the mobile station. If the measured and reported SINR is indicative of an acceptable data rate, i.e. is greater than that SINR threshold (Threshold 2), then at step 304, the new user data packet is processed in the OFDMA mode and is transmitted over the granted OFDMA frequency resources using the maximum allowed average OFDMA transmit power. If the SINR is unacceptable because the supportable data rate at that SINR is too low, then, at step 306, a determination is made whether the mode of processing should be changed to CDMA by determining whether the allowable CDMA transmit power is greater than the maximum average OFDMA transmit power (Threshold 1), the allowable CDMA transmit power being the minimum of the mobile station's maximum average CDMA transmit power and the power limit imposed by control signals from adjacent sectors. If the allowable CDMA power is greater than the maximum average OFDMA transmit power (Threshold 1), then the mode of processing is switched from OFDMA to CDMA and, at step 307, the new packet is transmitted in the CDMA mode using the maximum allowed average CDMA power. If, however, the allowable CDMA power is less than or equal to maximum average transmit power using OFDMA, then the mobile station remains in the OFDMA mode and, at step 304, the new user data packet is transmitted using OFDMA using the maximum allowed average OFDMA power.

When, at step 302, the previous user data packet was processed in the CDMA mode, a determination is made, at step 308, whether the measured average mobile station transmit power used to transmit the packet was less than or equal to the maximum average OFDMA transmit power (Threshold 1), i.e., is the mobile station transmitting at a power that is below the OFDMA power limit. If it is not transmitting below that OFDMA power limit, then, at step 307, the new user data packet is transmitted using CDMA, using the maximum allowed average CDMA power. If, however, at step 308, the measured mobile station transmit power is less than the OFDMA power limit, a determination is made, at step 309, whether the allowable average OFDMA transmit power is greater than the measured average mobile station transmit power (i.e., is the mobile station able to transmit at higher than the measured transmit power using OFDMA). If the allowable average OFDMA transmit power is not greater than the measured average CDMA mobile station transmit power, then, at step 307, the new user data packet is transmitted using the CDMA mode using the maximum allowed average CDMA power. If the allowable OFDMA transmit power is greater than the current CDMA mobile station transmit power, then before the mode is switched to OFDMA, a determination is made, at step 310, whether the reported-back or mobile-station-calculated OFDMA SINR is greater than a SINR threshold (Threshold 3) that determines whether better data rates are achievable using OFDMA as opposed to CDMA. If better data rates are not achievable using OFDMA, then the mode is not switched and, at step 307, the packet is transmitted using CDMA using the maximum allowed average CDMA power. If better data rates are achievable using OFDMA, then the mode is switched to OFDMA and, at step 304, the new user data packet is transmitted using OFDMA using a maximum allowed average OFDMA transmit power.

Advantageously, the above-described methodology ensures that the mobile transmission range is extended and that the minimum data rates at the cell edge are increased.

It is also noted that at low signal-to-noise ratios, the pre-coded CDMA waveform offers lower pilot overheads and hence better performance. Conversely, the pilot overheads for an OFDMA transmission are lower (and overall performance better) for higher signal-to-noise ratio than for pre-coded CDMA. Thus, the above-described methodology extends range not only due to the reduced PAPR of the CDMA waveform, but also do to the lower signal-to-noise ratios required for the typically lower rates allowed at the edge of the cell.

Although described in conjunction with a proposed hybrid CDMA/OFDMA 3GPP2 system, the present invention can be used in any type of system that uses two different encoding and modulation schemes that have different PAPRs as, for example, a hybrid OFDMA system and a Single Carrier Frequency Division Multiple Access (SC-FDMA) system.

The preceding merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagram and flowchart herein represents a conceptual view illustrating the principles of the invention. Similarly, it will be appreciated that the various processes described may be substantially represented in computer readable medium and so executed by a computer or processor, whether or not such computer or processor is explicitly shown.

The functions of the various elements shown in the FIG. 2 and the various steps shown in FIG. 3 may be provided and/or performed through the use of dedicated hardware as well as hardware capable of executing software in association with appropriate software.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. A method at a mobile station in a wireless communication system that is in communication with a base station, the method comprising:

operating an uplink for transmitting new user data in either a first or second predetermined encoding and modulation mode as determined in response to a measured average transmission power of the mobile station for previous user data and a Signal-to-Interference plus Noise Ratio (SINR) as measured at the base station and reported to the mobile station or as calculated by the mobile station from measurements made by the base station that are reported to the mobile station, wherein the Peak-to-Average Power Ratio (PAPR) of the first and second encoding and modulation modes are different.

2. The method of claim 1 wherein the first encoding and modulation mode is a pre-coded CDMA (Code Division Multiple Access) mode and the second mode is an OFDMA (Orthogonal Frequency Division Multiple Access) mode.

3. The method of claim 2 wherein a new user data packet is transmitted using the OFDMA mode when a previous user data packet was transmitted using the OFDMA mode and when the measured average transmission power of the previous user data packet measured over one or more frames is less than a maximum average OFDMA transmit power.

4. The method of claim 3 wherein the new user data packet is transmitted using a maximum allowed average OFDMA power, wherein the maximum allowed average OFDMA power is the minimum of the maximum average OFDMA transmit power and a power limit imposed by control signals from one or more sectors adjacent to the mobile station's own sector.

5. The method of claim 2 wherein a new user data packet is transmitted using the CDMA mode when a previous user data packet was transmitted using the CDMA mode and when the measured average transmission power of the previous user data packet measured over one or more frames is greater than a maximum average OFDMA transmit power.

6. The method of claim 5 wherein the new user data packet is transmitted using a maximum allowed average CDMA power, wherein the maximum allowed average CDMA power is the minimum of the maximum average CDMA transmit power and a power limit imposed by control signals from one or more sectors adjacent to the mobile station's own sector.

7. The method of claim 3 wherein the new user data packet is transmitted using the CDMA mode when the previous user data packet was transmitted using the OFDMA mode, when the measured average transmission power of the previous user data packet measured over one or more frames is greater than or equal to a maximum average OFDMA transmit power, and when the received or calculated SINR is less than or equal to a threshold that corresponds to a minimum acceptable OFDMA data rate.

8. The method of claim 7 wherein the new user data packet is transmitted using the OFDMA mode when the previous user data packet was transmitted using the OFDMA mode, when the measured average transmission power of the previous packet measured over one or more frames is greater than or equal to the maximum average OFDMA transmit power, and when the received or calculated SINR is greater than the threshold corresponding to the minimum acceptable OFDMA data rate and/or an allowable CDMA transmit power is greater than or equal to the maximum average OFDMA transmit power.

9. The method of claim 5 wherein the new user data packet is transmitted using the OFDMA mode when the previous user data packet was transmitted using the CDMA mode, when the measured average transmit power of the previous packet measured over one or more frames is less that the maximum average transmit OFDMA power, and when the received or calculated SINR is greater than or equal to a threshold that determines when a higher data rate is achievable using the OFDMA mode rather than the CDMA mode.

10. The method of 9 wherein the new user data packet is transmitted using the CDMA mode when the previous user data packet was transmitted using the CDMA mode, when the measured average transmit power of the previous packet measured over one or more frames is less than the maximum average OFDMA transmit power, and when the received or calculated SINR is less than the threshold that determines when a higher data rate is achievable using the OFDMA mode rather than the CDMA mode and/or an allowable average OFDMA transmit power is greater than the measured average transmit power of the previous packet measured over one or more frames.

11. A mobile station in wireless communication system, the mobile station operatively connected to a base station in the wireless communication system, the mobile station comprising:
  a first encoder and modulator operative for processing new user data in a first encoding and modulation mode;
  a second encoder and modulator operative for processing the new user data in a second encoding and modulation mode;
  a transmitter for transmitting encoded and modulated new user data from the first encoder and modulator or second encoder and modulator; and
  a switch operative to provide new user data for processing by either the first encoder and modulator in the first mode or the second encoder and modulator in the second mode and to provide the encoded and modulated new user data to the transmitter, the switch switching between the first encoder and modulator and the second encoder and modulator in response to a measured average transmission power of the mobile station for previous user data and a Signal-to-Interference plus Noise Ratio (SINR) as measured at the base station and reported to the mobile station or as calculated by the mobile station from measurements made by the base station that are reported to the mobile station, wherein the Peak-to-Average Power Ratio (PAPR) of the first and second encoding and modulation modes are different.

12. The mobile station of claim 11 wherein the first encoding and modulation mode is a pre-coded CDMA (Code Division Multiple Access) mode and the second mode is an OFDMA (Orthogonal Frequency Division Multiple Access) mode.

13. The mobile station of claim 12 wherein the switch is operative to switch a new user data packet for processing in the OFDMA mode when a previous user data packet was transmitted using the OFDMA mode and when the measured average transmission power of the previous user data packet measured over one or more frames is less than a maximum average OFDMA transmit power.

14. The mobile station of claim 13 wherein the new user data packet is transmitted using a maximum allowed average OFDMA power, wherein the maximum allowed average OFDMA power is the minimum of the maximum average OFDMA transmit power and a power limit imposed by control signals from one or more sectors adjacent to the mobile station's own sector.

15. The mobile station of claim 12 wherein the switch is operative to switch a new user data packet for processing in the CDMA mode when a previous user data packet was transmitted using the CDMA mode and when the measured average transmission power of the previous user data packet measured over one or more frames is greater than a maximum average OFDMA transmit power.

16. The mobile station of claim 15 wherein the new user data packet is transmitted using a maximum allowed average CDMA power, wherein the maximum allowed average CDMA power is the minimum of the maximum average CDMA transmit power and a power limit imposed by control signals from one or more sectors adjacent to the mobile station's own sector.

17. The mobile station of claim 13 wherein the switch is operative to switch a new user data packet for processing in the CDMA mode when the previous user data packet was transmitted using the OFDMA mode, when the measured average transmission power of the previous user data packet measured over one or more frames is greater than or equal to a maximum average OFDMA transmit power, and when the received or calculated SINR is less than or equal to a threshold that corresponds to a minimum acceptable OFDMA data rate.

18. The mobile station of claim 17 wherein the new user data packet is transmitted using the OFDMA mode when the previous user data packet was transmitted using the OFDMA mode, when the measured average transmission power of the previous packet measured over one or more frames is greater than or equal to the maximum average OFDMA transmit power, and when the received or calculated SINR is greater than the threshold corresponding to the minimum acceptable OFDMA data rate and/or an allowable CDMA transmit power is greater than or equal to the maximum average OFDMA transmit power.

19. The mobile station of claim 15 wherein the new user data packet is transmitted using the OFDMA mode when the previous user data packet was transmitted using the CDMA mode, when the measured average transmit power of the previous packet measured over one or more frames is less that the maximum average transmit OFDMA power, and when the received or calculated SINR is greater than or equal to a threshold that determines when a higher data rate is achievable using the OFDMA mode rather than the CDMA mode.

20. The mobile station of 19 wherein the new user data packet is transmitted using the CDMA mode when the previous user data packet was transmitted using the CDMA mode, when the measured average transmit power of the previous packet measured over one or more frames is less than the maximum average OFDMA transmit power, and when the received or calculated SINR is less than the threshold that determines when a higher data rate is achievable using the OFDMA encoder and modulator rather than the CDMA encoder and modulator and/or an allowable average OFDMA transmit power is greater than the measured average transmit power of the previous packet measured over one or more frames.

* * * * *